United States Patent [19]

Jardine

[11] Patent Number: 4,526,415
[45] Date of Patent: Jul. 2, 1985

[54] GLARE ATTENUATING ATTACHMENT FOR VEHICLE SUN VISORS

[76] Inventor: George W. Jardine, 12 Lake Rd., Waltham, Mass. 02154

[21] Appl. No.: 561,893

[22] Filed: Dec. 15, 1983

[51] Int. Cl.³ .............................................. B60J 3/00
[52] U.S. Cl. .............................. 296/97 F; 296/97 G; 160/DIG. 3
[58] Field of Search ................. 296/97 R, 97 F, 97 G; 160/DIG. 3

[56] References Cited

U.S. PATENT DOCUMENTS 3,304,118 2/1967 Jonas .................................. 296/97 R
3,445,135 5/1969 Masi ................................... 296/97 F

FOREIGN PATENT DOCUMENTS 2238608 2/1975 France ............................... 296/97 F Primary Examiner—Robert R. Song
Attorney, Agent, or Firm—Joseph S. Iandiorio; William E. Noonan

[57] ABSTRACT

A glare attenuating attachment for a vehicle sun visor including a glare attenuating element which is attached to the sun visor. The element includes a transparent glare attenuating section, an extension section for abutting the sun visor, and a junction section for interconnecting the glare attenuating section and extension section proximate the bottom edge of the sun visor. The glare attenuating section is thereby suspended below the bottom edge of the visor.

16 Claims, 5 Drawing Figures

GLARE ATTENUATING ATTACHMENT FOR VEHICLE SUN VISORS

FIELD OF INVENTION

This invention relates to a glare attenuating attachment for mounting on the sun visor of an automobile or other vehicle.

BACKGROUND OF INVENTION

Sunlight and headlight glare is an annoying and oftentimes hazardous nuisance encountered by both drivers and passengers in automobiles and other vehicles. Such glare is particularly troublesome at dawn or dusk, when the sun is low in the sky. Severe glare is also often encountered when oncoming headlights reflect from a rain-soaked highway or when the midday sun's rays reflect from a cement or other reflective roadway.

Because the common automobile sun visor has not satisfactorily alleviated this problem, many vehicles have been provided with tinted windows. However, such windows tend to be extremely costly, either adding to the initial expense of the vehicle or being very expensive to install in a vehicle not otherwise equipped with tinted windows. Additionally, tinted windows are basically permanent fixtures and not all vehicle owners may desire this feature.

SUMMARY OF INVENTION

Therefore, it is an object of this invention to provide a new and improved glare attenuating attachment for a vehicle sun visor which quickly and effectively reduces headlight and sunlight glare for drivers and passengers alike, thereby enhancing driving comfort and safety.

It is a further object of this invention to provide a glare attenuating attachment for vehicle sun visors which may be simply, quickly and securely attached to virtually all existing vehicle sun visors.

It is a further object of this invention to provide a glare attenuating attachment for vehicle sun visors which presents an inexpensive but effective substitute for tinted vehicle windows.

It is a further object of this invention to provide a glare attenuating attachment for vehicle sun visors which may be quickly moved into and out of its operating position and which is contoured so as not to damage the interior of the vehicle.

This invention features a glare attenuating attachment for a vehicle sun visor including a glare attenuating element. This element includes a transparent glare attenuating section, an extension section for abutting the sun visor, and a junction section for interconnecting the glare attenuating section and the extension section proximate the bottom of the sun visor. The glare attenuating section is thereby suspended below the bottom edge of the visor. Further provided are means for attaching the glare attenuating element to the visor.

In a preferred embodiment, the glare attenuating section and extension section may be connected at an angle. The glare attenuating section may include a first panel and the extension section may include a second panel, and these first and second panels may be connected at an angle of between 90° and 180°. The extension section panel may include an inside surface for abutting the front surface of the sun visor to suspend the glare attenuating panel in a generally rearward direction beneath the bottom of the visor.

The means for attaching may include slot means disposed in the glare attenuating element and strap means receivable through the slot means and engageable with the visor. Such slot means may be disposed in the junction portion. The transparent glare attenuating section may be tinted. The extension section may include a transparent glare attenuating material, and the junction section may include a transparent glare attenuating material. The glare attenuating, extension and junction sections may be integrally interconnected. Means may also be included for permanently fastening the strap to the extension attenuating element.

The glare attenuating section may include a distal edge which is slanted proximate the opposite ends thereof to generally conform to the contour of the vehicle, and/or may also include a pair of curved corners proximate the distal edge. Alternatively, the glare attenuating section may include a distal edge which is curved to generally conform to the contour of the vehicle roof.

DISCLOSURE OF PREFERRED EMBODIMENT

Other objects, features and advantages will occur from the following description of a preferred embodiment and the accompanying drawings, in which.

A glare attenuating attachment for a vehicle sun visor according to this invention may be effected using a preferably one-piece glare attenuating element which includes a transparent glare attenuating section, an extension section for abutting the sun visor, and a junction section for interconnecting the glare attenuating and extension sections proximate the bottom of the sun visor. Typically, the glare attenuating and extension sections comprise first and second panels which are interconnected at an angle of between 90° and 180°. The extension panel includes an inside surface which abuts the front surface of the sun visor to suspend the glare attenuating panel in a generally rearward direction beneath the bottom of the sun visor. An angle of approximately 140° between the panels enables the glare attenuating panel be to suspended in a position convenient for both glare-reduced viewing when the sun visor is pivoted downwardly, and storage when the visor is pivoted upwardly.

Means are provided for attaching the glare attenuating element to the sun visor and such means preferably include a slot disposed in the glare attenuating element, typically in the junction section thereof, and strap means which are received through the slot and which engage with the visor. Means such as a rivet or contact cement may be provided to permanently fasten the strap to the glare attenuating element. The strap may include leather, webbing, cloth or similar material. Such a manner of attachment is preferred over adhesives, which tend to loosen and thus cause the glare attenuating element to become disattached when the interior of the vehicle becomes hot, such as on a sunny day when the windows are closed.

The glare attenuating element is preferably constructed from an approximately ⅛ inch thick plastic sheet, which is bent into the desired angle. Examples of material which are suitable for the glare attenuating element are lexan and acrylic. The glare attenuating element may be tinted an appropriate color, such as gray or bronze. Alternatively, it may be polarized. The distal edge of the glare attenuating section is preferably cut so that each end thereof is slanted or curved. Further, the ends of the distal edge may be rounded. Such construction is provided so that the distal edge substantially conforms to the contour of the vehicle's ceiling. In this way, sharp edges are eliminated, and when the sun visor is raised the glare attenuating element will not damage the vehicle's ceiling.

The glare attenuating attachment of this invention is readily and quickly installed in virtually all existing sun visors of automobiles and provides for quick and effective screening of both direct and reflected rays from the sun and headlight glare without the necessity of installing expensive tinted windows in the vehicle.

Figure 1:
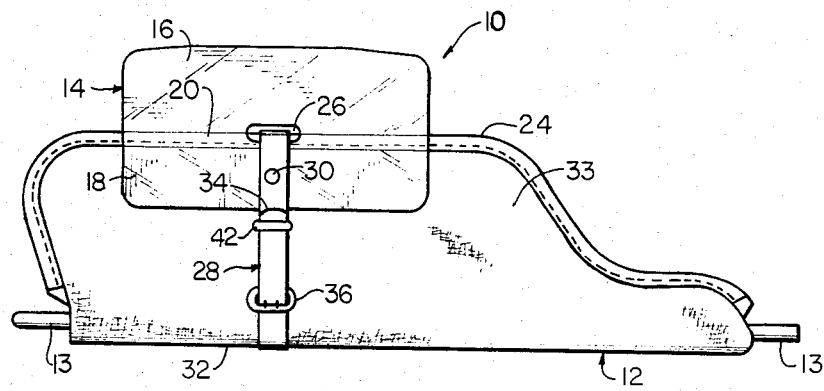
FIG. 1 is an elevational front view of the attachment of this invention as it is mounted in relation to the front surface of the vehicle sun visor.

There is shown in FIG. 1 a glare attenuating attachment 10 attached to a visor 12 which is pivotably mounted in a conventional manner in a vehicle by a bar 13. A one-piece glare attenuating element 14 includes a glare attenuating panel 16, an extension panel 18 and a junction section 20 interconnecting the glare attenuating and extension panels. Element 14 is positioned so that the inside surface of extension panel 18 abuts the front surface of visor 12. Glare attenuating panel 16 thereby suspends below the bottom edge 24 of visor 12.

A slot 26 is disposed in junction section 20 so that when element 14 is positioned as shown the slot 26 is proximate bottom edge 24 of visor 12. Element 14 is secured to visor 12 by means of a strap 28. Strap 28 extends laterally across extension panel 18 and is permanently fastened to the extension panel by means of a rivet 30. The strap then extends through slot 26. To attach element 14 to visor 12, strap 28 is wrapped about the visor. The strap extends under the bottom edge 24, up the obscured back surface, over the top edge 32 and down across the front surface 33 of the visor. End 34 is inserted through a buckle 36 which is attached to the other obscured end of strap 28 and the strap is drawn snugly through the buckle and fastened so that element 14 is secured to the visor. Paper clip 42 or a similar device may be used to secure the end 38 to the rest of the strap 28 so that the loose end does not dangle. Rivet 30 prevents strap 28 from sliding through slot 26 and holds the strap 28 and glare attenuating element 14 together so that they may be quickly and conveniently mounted to the visor.

Figure 2:
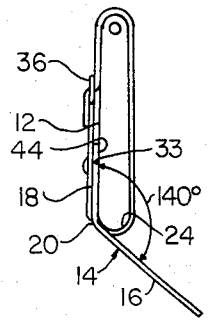
FIG. 2 is an elevational side view of the glare attenuating attachment according to this invention attached to a vehicle sun visor.

As shown in FIG. 2, when surface 44 of extension section 18 abuts front surface 33 of visor 12 and when strap 28 is properly engaged with visor 12 and inserted through buckle 36 and secured, element 14 is thereby attached to visor 12 so that glare attenuating panel 16 suspends below the bottom edge 24 of visor 12 in a generally rearward direction. Junction section 20 interconnects extension panel 18 and glare attenuating panel 16 at an angle of 140°.

Figure 3:
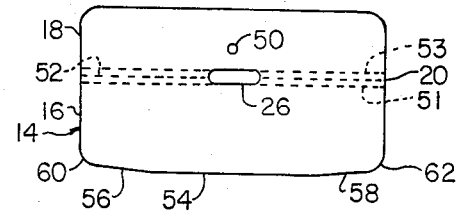
FIG. 3 is a plan view of an integral glare attenuating element employed by the attachment of this invention.

Element 14, FIG. 3, is constructed from a single piece of tinted transparent material which is punched to form slot 26 and a hole 50 for accommodating rivet 30 of FIGS. 1 and 2. Element 14 is bent along line 52, FIG. 3, at the angle illustrated in FIG. 2, to provide curved junction section 20 generally indicated between the dashed lines 51, 53 for interconnecting panels 16 and 18. The distal edge 54 of glare attenuating panel 16 is cut along slants 56 and 58 at either end thereof and is provided with rounded corners 60 and 62.

Figure 4:
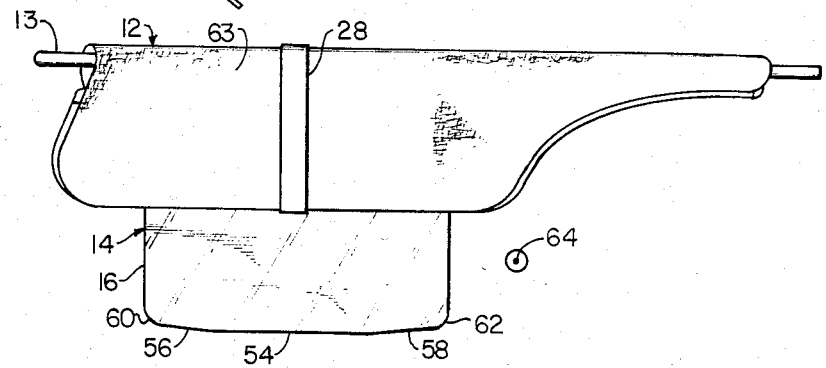
FIG. 4 is an elevational rear view of the glare attenuating attachment mounted in relation to the rear surface of the vehicle sun visor.

As shown in FIG. 4, from the driver's or passenger's seat only glare attenuating panel 16 of element 14 is visible. Further, only the portion of strap 28 which extends across the back surface 63 of the visor is visible. Buckles, rivets and loose ends of the strap are hidden. If the glare-reducing effects of attachment 10 are not required, the panel may be moved out of the line of sight simply by pivoting visor 12 on arm 13 rearwardly in the direction of arrow 64. Slants 56 and 58 and rounded corners 60 and 62 enable distal edge 54 of glare attenuating panel 16 to subtantially conform to the ceiling of the vehicle and thereby prevent ripping of the ceiling when the visor 12 and attachment 10 are retracted.

Figure 5:
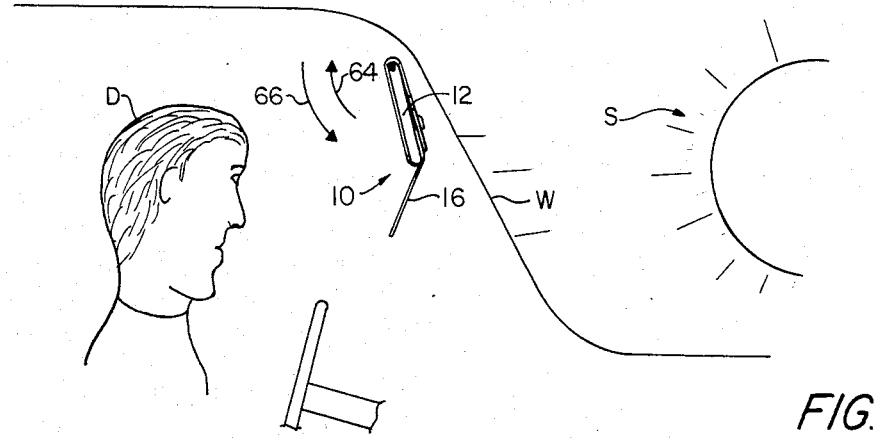
FIG. 5 is a simplified diagrammatic view of the glare attenuating attachment in use in an automobile.

Further operation of attachment 10 is illustrated in FIG. 5. At times when direct or reflected sunlight S, (or headlights or other types of glare) interfere with the driver's vision, the visor may be pivoted in the direction of arrow 66, until glare attenuating panel 16 is in position to screen the sun's rays and provide driver D with improved driving vision. When the sunscreen attachment is no longer needed, the visor is simply pivoted all the way back in the direction of arrow 64 and an unobstructed view through the window W is provided.

Other embodiments will occur to those skilled in the art and are within the following claims:

What is claimed is:

1. A glare attenuating attachment for a vehicle sun visor comprising:
   a glare attenuating element including a transparent glare attenuating section, an extension section for abutting the sun visor, and a junction section for interconnecting said glare attenuating section and said extension section proximate the bottom edge of the sun visor to suspend said glare attenuating section below the bottom edge of the visor;
   means for attaching said glare attenuating element to the visor including slot means disposed in said glare attenuating element and strap means receivable through said slot means and wrappable about and engageable with the top and bottom edges of said visor; and
   means for permanently fastening said strap to said glare attenuating element.

2. The attachment of claim 1 in which said glare attenuating section includes a first panel.

3. The attachment of claim 1 in which said extension section includes a second panel.

4. The attachment of claim 1 in which said junction section interconnects said glare attenuating section and said extension section at an angle.

5. The attachment of claim 1 in which said junction section interconnects glare attenuating section and said extension section at an angle of between 90° and 180°.

6. The attachment of claim 1 in which said slot means are disposed in said junction section.

7. The attachment of claim 1 in which said glare attenuating section is tinted.

8. The attachment of claim 1 in which said glare attenuating section, extension section and junction section are integrally interconnected.

9. The attachment of claim 1 in which said glare attenuating section includes a distal edge which is slanted proximate the opposite ends thereof to generally conform to the contour of the vehicle ceiling.

10. The attachment of claim 1 in which said glare attenuating section includes a distal edge having rounded corners at either end thereof.

11. The attachment of claim 1 in which said glare attenuating section includes a distal edge which is curved to generally conform to the contour of the vehicle ceiling.

12. A glare attenuating attachment for a vehicle sun visor comprising:

a glare attenuating element including a transparent glare attenuating panel, an extension panel and a junction section for integrally interconnecting said glare attenuating panel and said extension section at an angle proximate the bottom edge of the sun visor, said extension panel having an inside surface for abutting the front surface of the sun visor to suspend said glare attenuating panel in a generally rearward direction beneath the bottom of the visor;

means for attaching said glare attenuating element to the visor including slot means disposed in said glare attenuating element and strap means receivable through said slot means and wrappable about and engageable with both top and bottom edges of the visor; and means for permanently fastening said strap to said glare attenuating element.

13. The attachment of claim 12 in which said slot means are disposed in said junction section.

14. The attachment of claim 12 in which said glare attenuating section is tinted.

15. The attachment of claim 12 in which said glare attenuating section includes a distal edge which is slanted proximate the opposite ends thereof to generally conform to the contour of the vehicle ceiling.

16. The attachment of claim 12 in which said glare attenuating section includes a distal edge having rounded corners at either end thereof.

* * * * *